(12) United States Patent
Doughty

(10) Patent No.: US 12,384,199 B2
(45) Date of Patent: Aug. 12, 2025

(54) VEHICLE TIRE CHANGING APPARATUS

(71) Applicant: James Doughty, Orleans (CA)

(72) Inventor: James Doughty, Orleans (CA)

( * ) Notice: Subject to any disclaimer, the term of this patent is extended or adjusted under 35 U.S.C. 154(b) by 454 days.

(21) Appl. No.: 17/456,046

(22) Filed: Nov. 22, 2021

(65) Prior Publication Data
US 2023/0173841 A1    Jun. 8, 2023

(51) Int. Cl.
*B60B 29/00* (2006.01)
(52) U.S. Cl.
CPC .................... *B60B 29/002* (2013.01)
(58) Field of Classification Search
CPC ..................................... B60B 29/002
USPC ..................... 157/14; 414/426–428
See application file for complete search history.

(56) References Cited

U.S. PATENT DOCUMENTS

| | | | | |
|---|---|---|---|---|
| 2,502,285 A | * | 3/1950 | Smith | B60B 29/002 254/10 R |
| 5,007,789 A | * | 4/1991 | Painter | B60B 29/002 414/427 |
| 7,918,637 B2 | * | 4/2011 | Wolterman | B62B 3/104 414/463 |
| 2022/0314694 A1 | * | 10/2022 | Bell | B60B 29/002 |

* cited by examiner

*Primary Examiner* — Hadi Shakeri
(74) *Attorney, Agent, or Firm* — Orin Del Vecchio

(57) ABSTRACT

A vehicle tire changing apparatus that is operable to assist a user in the tire changing process on a vehicle. The present invention includes a base platform member that is movably mounted onto four wheels in the corners thereof. The base platform member has a first post member and a second post member secured to the upper surface thereof that extend upward therefrom. A tire support member is movably coupled to the base platform member and is superposed thereto. The tire support member will move in an upwards-downwards movement along the first post member and second post member. The tire support member includes a first roller assembly and a second roller assembly secured to the upper surface. The first roller assembly and second roller assembly are configured to provide rotational movement of a tire engaged therewith.

9 Claims, 3 Drawing Sheets

VEHICLE TIRE CHANGING APPARATUS

FIELD OF THE INVENTION

The present invention relates generally to vehicle maintenance apparatus, more specifically but not by way of limitation, a vehicle tire changing apparatus that is configured to facilitate changing of a tire wherein the present invention provides lifting of the tire and alignment thereof so as to improve installation of a tire/wheel assembly onto a vehicle.

BACKGROUND

Millions of people have to change a vehicle tire every year. Whether the tire is required to be changed as a result of a flat, routine maintenance or for weather related reasons, changing of a tire is very common. It is more common for those individuals that live in climates wherein it is either desirable or a legal requirement to change tires more suited for snow and ice conditions. Regardless of the reason it is quite a cumbersome and somewhat physically challenging experience to change a tire. The average passenger car tire and rim can weigh between fifty and sixty pounds. Larger all terrain tires and snow tires will weigh even more. This weight makes it quite difficult to change a tire and can present a potential physically hazardous situation for some people.

As is known in the art, during the changing of a tire, the vehicle or a portion thereof is elevated utilizing a car jack or similar device. The vehicle must be elevated at a sufficient level so as to be able to place the new tire onto the lug nuts. The aforementioned requires that the vehicle be positioned such that it will be required for an individual to both lift the tire and rotationally align the lug holes with the lugs on the vehicle. It is this lifting requirement that can be potentially dangerous for an individual due to the height and rotational manipulation requirements for successful positioning of a replacement tire/wheel assembly. While vehicle jacks are readily available, existing technology is deficient for tools or apparatus that assist with the lifting and positioning of a tire/wheel assembly for installation on a vehicle.

Accordingly, there is a need for an apparatus that can assist a user in both the lifting and rotational alignment of a tire/wheel assembly so as to facilitate installation of the tire/wheel assembly onto a vehicle.

SUMMARY OF THE INVENTION

It is the object of the present invention to provide a vehicle tire changing apparatus that is configured to assist in changing of a tire wherein the apparatus of the present invention includes a base platform member.

Another object of the present invention is to provide an apparatus configured to provide lifting and alignment of a tire/wheel assembly for installation onto a vehicle wherein the base platform member is movably mounted onto wheels so as to facilitate three hundred and sixty degree movement thereof.

A further object of the present invention is to provide a vehicle tire changing apparatus that is configured to assist in changing of a tire wherein the upper surface of the base platform member includes a lever engagement notch along at least one edge thereof.

Still another object of the present invention is to provide an apparatus configured to provide lifting and alignment of a tire/wheel assembly for installation onto a vehicle that further includes a tire support member wherein the tire support member is superposed the base platform member.

An additional object of the present invention is to provide a vehicle tire changing apparatus that is configured to assist in changing of a tire wherein the tire support member further includes on the upper surface thereof a first roller assembly and a second roller assembly.

Yet a further object of the present invention is to provide an apparatus configured to provide lifting and alignment of a tire/wheel assembly for installation onto a vehicle wherein the first roller assembly and second roller assembly are on opposing sides of the tire support member.

Another object of the present invention is to provide a vehicle tire changing apparatus that is configured to assist in changing of a tire wherein the apparatus further includes a first post member and a second post member.

Still an additional object of the present invention is to provide an apparatus configured to provide lifting and alignment of a tire/wheel assembly for installation onto a vehicle wherein the first post member and the second post member are secured to the upper surface of the base platform member and extend upward therefrom.

Yet another object of the present invention is to provide a vehicle tire changing apparatus that is configured to assist in changing of a tire wherein the tire support member is operably coupled to the first post member and second post member and is configured to travers upwards-downwards with respect thereto.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
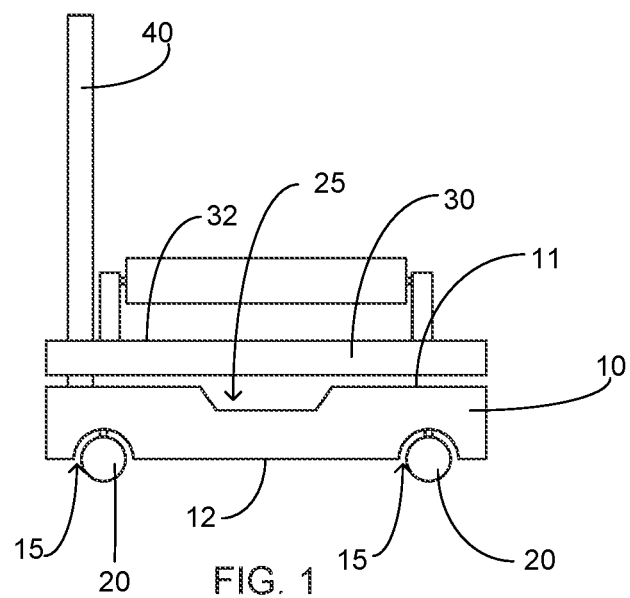
FIG. 1 is an end view of the present invention.
Figure 2:
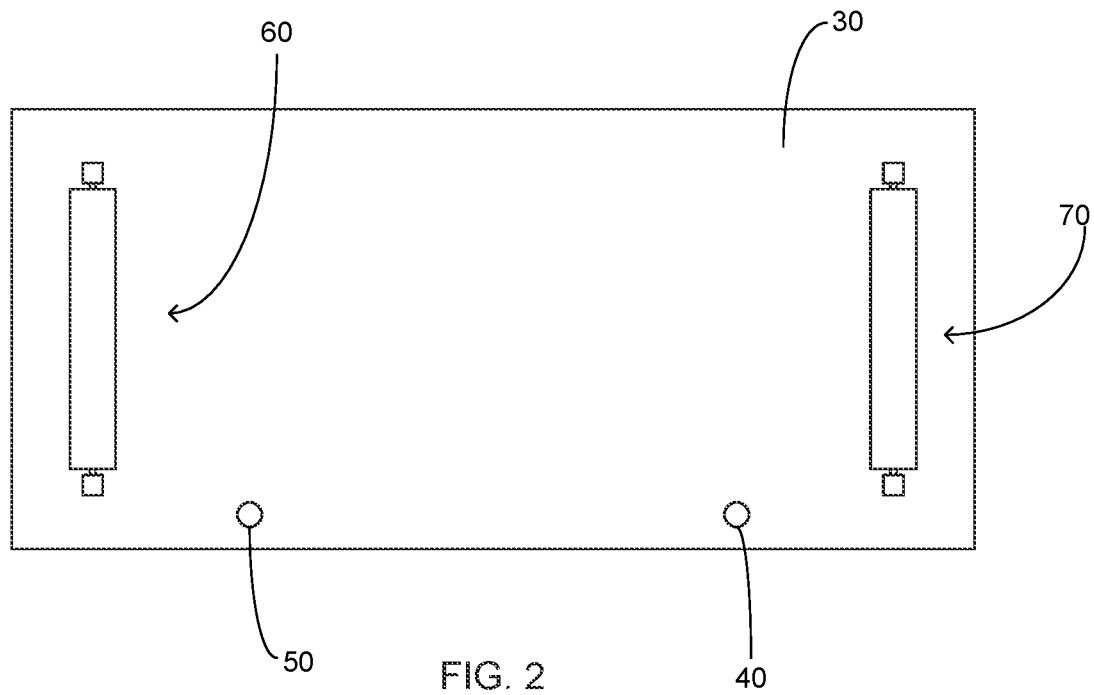
FIG. 2 is a top view of the tire support member of the present invention.
Figure 3:
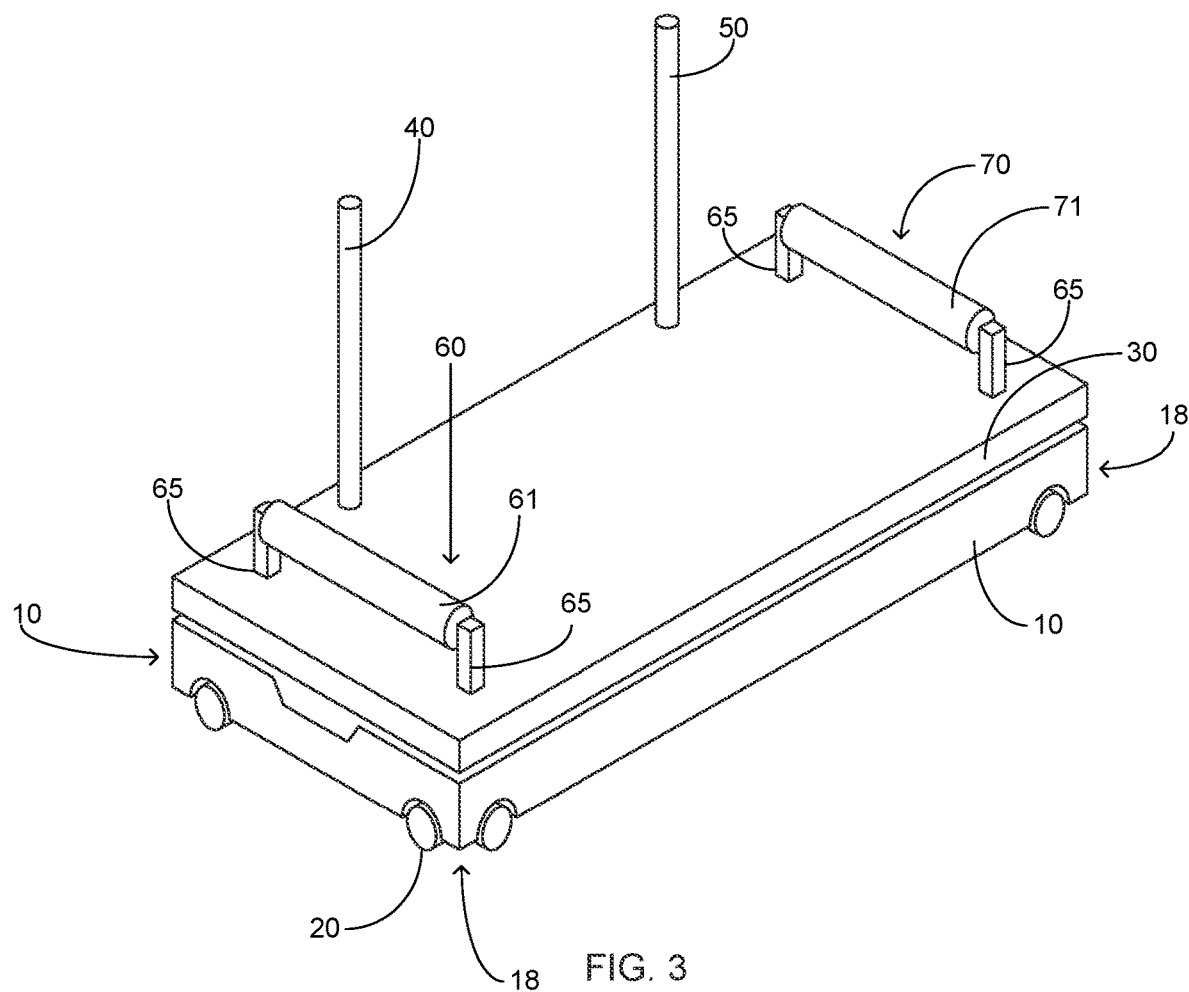
FIG. 3 is a perspective view of the present invention.

Referring now to the drawings submitted herewith, wherein various elements depicted therein are not necessarily drawn to scale and wherein through the views and figures like elements are referenced with identical reference numerals, there is illustrated a vehicle tire changing apparatus 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted as a part hereof, the vehicle tire changing apparatus 100 includes a base platform member 10. The base platform member 10 is planar in manner and rectangular in shape. The base platform member 10 is manufactured from a rigid lightweight material such as but not limited to wood or metal. The base platform member 10 includes an upper surface 11 and a lower surface 12. The lower surface 12 includes wheel cavities 15 wherein the wheel cavities 15 are formed in the lower surface 12 proximate each corner 18 of the base platform 10. The wheel cavities 15 are recessed into the lower surface 12 of the base platform 10 so as to reduce the overall height resulting from the installation of the wheels 20. The wheels 20 in a preferred embodiment are configured to move three hundred and sixty degrees so as to provide full rotational movement of the base platform member 10. This facilitates the ability for a user to correctly position the tire 99 during the mounting process. It is contemplated within the scope of the present invention that the wheels 20 could be manufactured in various embodiments. Furthermore, while four wheels 20 are present in a preferred embodiment, it is contemplated within the scope of the present invention that the base platform member 10 could employ more or less than four wheels in order to achieve the desired movement of the base platform member 10 during use of the vehicle tire changing apparatus 100.

The base platform member 10 includes a lever engagement notch 25 formed in the upper surface 11. The lever engagement notch 25 provides the necessary void between the upper surface 11 of the base platform member 10 and the lower surface 31 of the tire support member 30. The lever engagement notch 25 is centrally positioned intermediate the longitudinal edges of the base platform member 10 so as to facilitate upwards movement of the tire support member 30. During use of the vehicle tire changing apparatus 100 a user will leverage a conventional pry bar or other suitable element in the lever engagement notch 25 so as to facilitate the required upper movement of the tire support member 10 in order to properly position the tire 99. It should be understood within the scope of the present invention that while one lever engagement notch is illustrated herein, it is contemplated within the scope of the present invention that the vehicle tire changing apparatus 100 could have more than one lever engagement notch 25 placed in alternate locations. Additionally, it is contemplated within the scope of the present invention that the vehicle tire changing apparatus 100 could employ motorized movement of the tire support member 30 in place of utilizing a pry bar and the lever engagement notch.

The base platform member 10 has extending upward therefrom a first post member 40 and a second post member 50. The first post member 40 and second post member 50 extend upward from the upper surface 11 and are secured to the base platform member 10 utilizing suitable techniques. The first post member 40 and second post member 50 are manufactured from suitable rigid material such as but not limited to metal rods. The first post member 40 and second post member 50 provide two functions within the scope of the vehicle tire changing apparatus 100. First, the first post member 40 and second post member 50 provide the structural elements for which the tire support member 30 can traverse in an upwards-downwards movement. Additionally, the first post member 40 and second post member 50 are mounted with a spacing therebetween that provides support for a tire 99 adjacent thereto and inhibits the tire 99 from falling off of the tire support member 30. It should be understood within the scope of the present invention that the first post member 40 and second post member 50 could be provided in alternate heights. Furthermore, it is contemplated within the scope of the present invention that the first post member 40 and second post member 50 could be releasably secured to the base platform member 10 so as to facilitate removal thereof for easier storage of the vehicle tire changing apparatus 100 when not in use.

Figure 4:
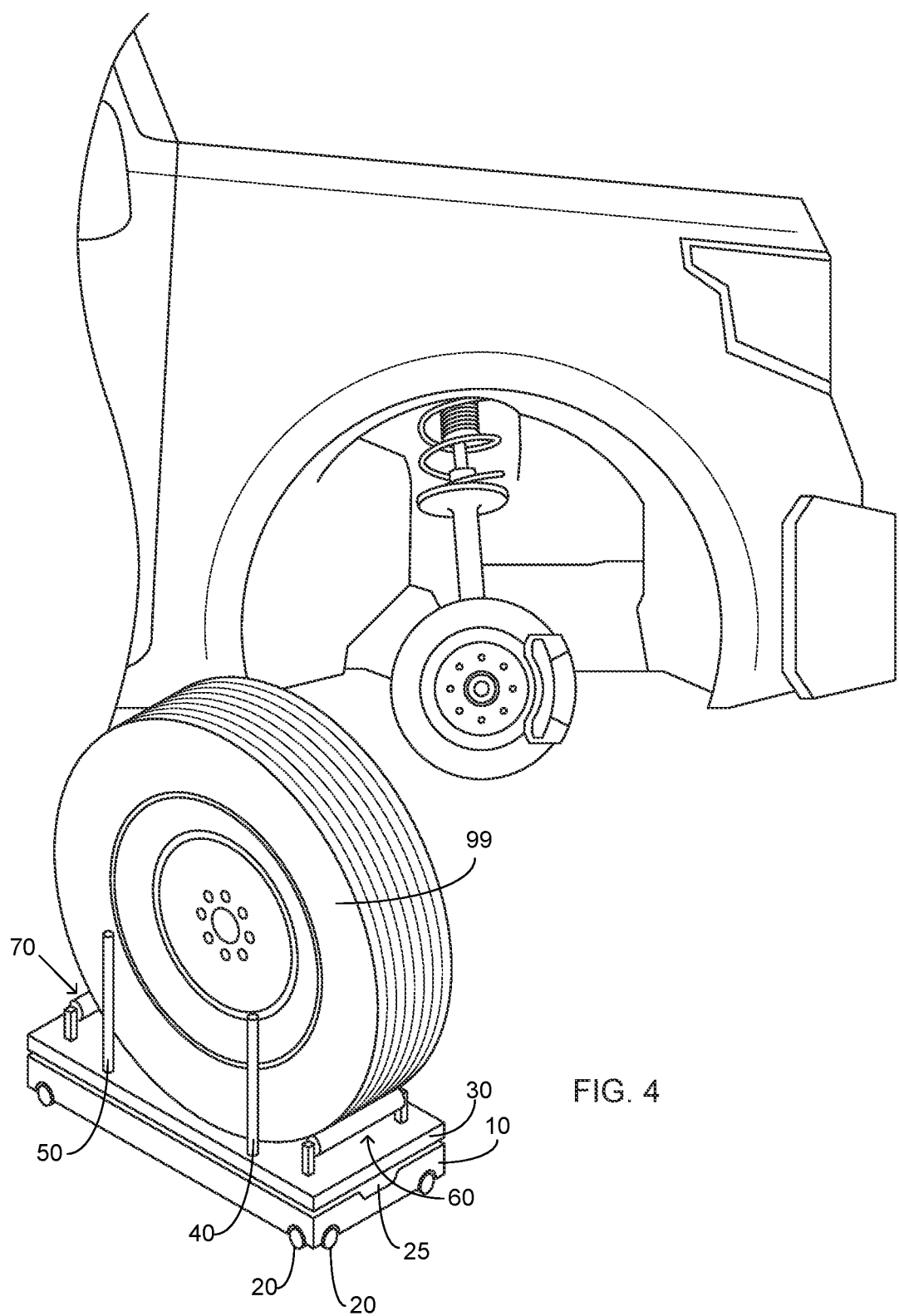
FIG. 4 is a perspective view of the present invention in an exemplary use.

The tire support member 30 includes upper surface 32 onto which the first roller assembly 60 and second roller assembly 70 are mounted. The tire support member 30 has a surface area generally equivalent to the base platform member 10 and is configured to receive a tire 99 thereon. The first roller assembly 60 and second roller assembly 70 are identically constructed and located on opposing ends of the tire support member 30. The first roller assembly 60 and second roller assembly 70 include rollers 61,71 that are movably mounted to mounts 65. The rollers 61,71 operably engage the tire 99 as shown herein in FIG. 4 to facilitate rotational movement of the tire 99 in order to provide proper alignment of the tire 99 to facilitate the installation thereof. It should be understood within the scope of the present invention that the first roller assembly 60 and second roller assembly 70 could be configured in alternate manners and achieve the desired objective discussed herein. This is to include but not be limited to an alternate quantity of roller assembly and various placement configurations thereof.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An apparatus operable in combination with a pry bar to assist a user install a tire on a vehicle wherein the apparatus comprises:
   a base platform member, said base platform member being planar in manner and rectangular in shape, said base platform member having an upper surface and a lower surface, said base member platform configured to be movable, wherein said base platform member further includes a lever engagement notch, said lever engagement notch being formed in the upper surface of said base platform, said lever engagement notch forming a void to accommodate an end of the pry bar therein;
   at least one post member, said at least one post member operably coupled to said upper surface of said base platform member, said at least one post member extending upward from said upper surface, said at least one post member being proximate a longer longitudinal edge of said base platform member;
   a tire support member, said tire support member being superposed said upper surface of said base platform member, said tire support member being a solid surface which is planar in manner, said tire support member operably coupled with said at least one post member and said tire support member is movable in an upwards-downwards movement along said at least one post member; and
   a first roller assembly and a second roller assembly, said first roller assembly and said second roller assembly being secured to an upper surface of said tire support member, said first roller assembly and said second roller assembly being located on opposing ends of said tire support member such that said at least one post member is positioned in an area between the first roller assembly and the second roller assembly,
   wherein the tire support member is moveable via lever action upon the pry bar when the pry bar is inserted into the lever engagement notch.

2. The apparatus operable to assist a user install the tire on the vehicle as recited in claim 1, wherein said base platform member further includes a plurality of wheel cavities, said plurality of wheel cavities formed in the lower surface of said base platform member.

3. The apparatus operable to assist a user install the tire on the vehicle as recited in claim 2, and further including a plurality of wheels, said plurality of wheels mounted within said plurality of wheel cavities, said plurality of wheels operable to move said base platform member.

4. The apparatus operable to assist a user install the tire on the vehicle as recited in claim 3, wherein said first roller assembly includes a roller, said roller being movably secured between two mounts.

5. The apparatus operable to assist a user install the tire on the vehicle as recited in claim 4, wherein said second roller assembly includes a roller, said roller of said second roller assembly being movably secured between a first mount and a second mount.

6. A tire changing apparatus operable in combination with a pry bar to assist a user install a tire on a vehicle wherein the apparatus comprises:
   a base platform member, said base platform member being planar in manner and rectangular in shape, said base platform member having an upper surface and a lower surface, said base member platform being rectangular in shape having four corners, said base platform member having a plurality of wheel cavities formed in the lower surface thereof, wherein said base platform member further includes a lever engagement notch, said lever engagement notch being formed in the upper surface of said base platform, said lever engagement notch forming a void to accommodate an end of the pry bar therein;
   a first post member and a second post member, said first post member and said second post member operably coupled to said upper surface of said base platform member, said first post member and said second post member extending upward from said upper surface, said first post member and said second post member being proximate a longer longitudinal edge of said base platform member having a void therebetween;
   a tire support member, said tire support member being superposed said upper surface of said base platform member, said tire support member being a solid surface which is planar in manner and rectangular in shape, said tire support member operably coupled with said first post member and said second post member and being configured to traverse in an upwards-downwards movement thereon; and
   a first roller assembly and a second roller assembly, said first roller assembly and said second roller assembly being secured to an upper surface of said tire support member, said first roller assembly and said second roller assembly being located on opposing ends of said tire support member such that said first post member and second post member are positioned in an area between the first roller assembly and the second roller assembly,
   wherein the tire support member is moveable via lever action upon the pry bar when the pry bar is inserted into the lever engagement notch.

7. The tire changing apparatus operable to assist a user install the tire on the vehicle as recited in claim 6, and further including a plurality of wheels, said plurality of wheels mounted within said plurality of wheel cavities, said plurality of wheels operable to move said base platform member.

8. The tire changing apparatus operable to assist a user install the tire on the vehicle as recited in claim 7, wherein said second roller assembly includes a roller, said roller of said second roller assembly being movably secured between a first mount and a second mount.

9. The tire changing apparatus operable to assist a user install the tire on the vehicle as recited in claim 8, wherein said first roller assembly includes a roller, said roller of said first roller assembly being movably secured between a first mounting member and a second mounting member.

* * * * *